(12) United States Patent
Hogben et al.

(10) Patent No.: US 10,558,814 B2
(45) Date of Patent: Feb. 11, 2020

(54) PRIVACY AWARE INTENT RESOLUTION WITH EXTERNAL SOURCES

(71) Applicant: Google LLC, Mountain View, CA (US)

(72) Inventors: Giles Hogben, Los Altos Hills, CA (US); Matthew Kulick, San Francisco, CA (US); Todd Kennedy, San Jose, CA (US); Dianne Hackborn, Mountain View, CA (US)

(73) Assignee: Google LLC, Mountain View, CA (US)

( * ) Notice: Subject to any disclaimer, the term of this patent is extended or adjusted under 35 U.S.C. 154(b) by 398 days.

(21) Appl. No.: 15/469,477

(22) Filed: Mar. 24, 2017

(65) Prior Publication Data

US 2018/0032741 A1    Feb. 1, 2018

Related U.S. Application Data

(60) Provisional application No. 62/368,977, filed on Jul. 29, 2016.

(51) Int. Cl.
*G06F 21/60* (2013.01)
*G06F 16/901* (2019.01)
(Continued)

(52) U.S. Cl.
CPC .............. *G06F 21/604* (2013.01); *G06F 8/60* (2013.01); *G06F 8/61* (2013.01); *G06F 9/06* (2013.01);
(Continued)

(58) Field of Classification Search
CPC ... G06F 8/60; G06F 8/61; G06F 9/445; G06F 9/06; G06F 16/9014; G06F 16/90344;
(Continued)

(56) References Cited

U.S. PATENT DOCUMENTS 7,665,094 B2   2/2010 Frender et al.
8,099,445 B1   1/2012 Masinter et al.
(Continued)

OTHER PUBLICATIONS

International Search Report and Written Opinion from PCT/US2017/044522, dated Oct. 25, 2017, 14 pages.
(Continued)

*Primary Examiner* — Teshome Hailu
*Assistant Examiner* — Benjamin A Kaplan
(74) *Attorney, Agent, or Firm* — McDonnell Boehnen Hulbert & Berghoff LLP

(57) ABSTRACT

Methods for identifying and obtaining a suitable application for interacting with a selected content item by providing secure access to a limited portion of information on the selected content item are provided. In one aspect, a method includes receiving a selection from a user in an initial application running on a device to interact with a content item accessible by the initial application, and generating a hash value from the limited portion of information on the content item. The method further includes requesting a copy of the at least one suitable application when the comparison of the hash value for the content item with the hash value for the suitable application match, executing the suitable application on the device, and providing the limited portion of information on the content item to the suitable application for interaction by the user. Systems and machine-readable media are also provided.

20 Claims, 6 Drawing Sheets

(51) Int. Cl.
*G06F 16/903* (2019.01)
*H04W 4/60* (2018.01)
*H04L 29/08* (2006.01)
*H04L 9/32* (2006.01)
*G06F 9/06* (2006.01)
*G06F 8/61* (2018.01)
*G06F 8/60* (2018.01)
*G06F 9/445* (2018.01)
*H04L 29/06* (2006.01)

(52) U.S. Cl.
CPC .......... *G06F 9/445* (2013.01); *G06F 16/9014* (2019.01); *G06F 16/90344* (2019.01); *H04L 9/3236* (2013.01); *H04L 63/18* (2013.01); *H04L 67/34* (2013.01); *H04W 4/60* (2018.02); *H04L 2209/60* (2013.01)

(58) Field of Classification Search
CPC ..... G06F 21/604; H04L 9/3236; H04L 63/18; H04L 67/34; H04L 2209/60; H04W 4/60
USPC .......................................................... 726/27
See application file for complete search history.

(56) References Cited

U.S. PATENT DOCUMENTS

| | | | |
|---|---|---|---|
| 9,298,928 | B2 | 3/2016 | Borghetti et al. |
| 9,342,536 | B2 | 5/2016 | Kache et al. |
| 2014/0096246 | A1 | 4/2014 | Morrissey et al. |
| 2015/0118994 | A1 | 4/2015 | Shin et al. |
| 2015/0195340 | A1 | 7/2015 | Tulchinsky et al. |
| 2016/0042191 | A1 | 2/2016 | Enck et al. |
| 2017/0337355 | A1* | 11/2017 | Biswas ............... G06F 21/6209 |
| 2017/0372600 | A1* | 12/2017 | Palin .................... G06F 3/0484 |
| 2018/0004497 | A1* | 1/2018 | Ramachandran ......... G06F 8/60 |
| 2018/0157712 | A1* | 6/2018 | Vestgote ........... G06F 16/90344 |

OTHER PUBLICATIONS

Wikipedia: "Hash function—Wikipedia," retrieved from https://en.wikipedia.org/w/index.php?title=Hash_function&oldid=729799323. old revision, edited Jul. 14, 2016, 13 pages.
Written Opinion of the International Preliminary Examining Authority from PCT/US2017/044522, dated Jul. 2, 2018, 7 pages.

* cited by examiner

PRIVACY AWARE INTENT RESOLUTION WITH EXTERNAL SOURCES

CROSS-REFERENCE TO RELATED APPLICATIONS

The present application claims the benefit of priority under 35 U.S.C. § 119 as a nonprovisional of U.S. Provisional Patent Application Ser. No. 62/368,977 entitled "Privacy Aware Intent Resolution with External Sources," and filed on Jul. 29, 2016, the disclosure of which is hereby incorporated by reference in its entirety for all purposes.

TECHNICAL FIELD

The present disclosure generally relates to accessing data objects on a device, and more specifically relates to identifying and obtaining a preferred application for accessing a selected data object.

BACKGROUND

When a user of a device selects an item in an initial application running on that device to be viewed, there is a possibility that the content item can be more suitably viewed in a more suitable application other than the initial application, but that the other application may not be available on the device or known to the user. In these instances, the user is commonly required to manually identify the other application that can more suitably view the content item by, for example, searching for the other application (among many possible applications for viewing the content item) in an external source listing, such as an application database (or "application store").

The description provided in the background section should not be assumed to be prior art merely because it is mentioned in or associated with the background section. The background section may include information that describes one or more aspects of the subject technology.

SUMMARY

According to certain aspects of the present disclosure, a computer-implemented method for identifying and obtaining a suitable application for interacting with a selected content item by providing secure access to a limited portion of information on the selected content item, the method is provided. The method includes receiving a selection from a user in an initial application running on a device to interact with a content item accessible by the initial application, and generating a hash value from a limited portion of information on the content item. The method also includes comparing a portion of the hash value generated from the limited portion of information on the content item to a corresponding portion of a hash value generated for at least one suitable application available in an application database, and comparing the hash value generated from the limited portion of information on the content item with the hash value generated for the at least one suitable application when the comparison of the portion of the hash value generated from the limited portion of information on the content item to the corresponding portion of the hash value generated for the at least one suitable application indicates a match. The method further includes requesting a copy of the at least one suitable application for execution on the device when the comparison of the hash value generated from the limited portion of information on the content item with the hash value generated for the at least one suitable application match. The method also includes executing the at least one suitable application on the device, and providing the limited portion of information on the content item to the at least one suitable application for interaction by the user.

According to certain aspects of the present disclosure, a system for identifying and obtaining a suitable application for interacting with a selected content item by providing secure access to a limited portion of information on the selected content item is provided. The system includes a memory comprising a content item and an initial application. The system also includes a processor configured to execute instructions. When executed, the instructions cause the processor to receive a selection from a user in the initial application running on a device to interact with the content item accessible by the initial application, and generate a hash value from a limited portion of information on the content item. The instructions also cause the processor to determine the device does not include a local application suitable for interacting with the content item, and compare a portion of the hash value generated from the limited portion of information on the content item to a corresponding portion of a hash value generated for at least one suitable application available in an application database. The instructions further cause the processor to compare the hash value generated from the limited portion of information on the content item with the hash value generated for the at least one suitable application when the comparison of the portion of the hash value generated from the limited portion of information on the content item to the corresponding portion of the hash value generated for the at least one suitable application indicates a match, and request a copy of the at least one suitable application for execution on the device when the comparison of the hash value generated from the limited portion of information on the content item with the hash value generated for the at least one suitable application match. The instructions also cause the processor to execute the at least one suitable application on the device, and provide a limited portion of information on the content item to the at least one suitable application for interaction by the user.

According to certain aspects of the present disclosure, a non-transitory machine-readable storage medium comprising machine-readable instructions for causing a processor to execute a method for identifying and obtaining a suitable application for interacting with a selected content item by providing secure access to a limited portion of information on the selected content item is provided. The method includes receiving a selection from a user in an initial application running on a device to interact with a content item comprising a Uniform Resource Locator (URL) accessible by the initial application, and generating a hash value from a host of the URL. The method also includes determining the device does not include a local application suitable for interacting with the content item, and generating, for each of a plurality of applications in an application database, a corresponding hash value using information identifying a host with which the corresponding application from the plurality of applications is configured to interact, wherein the plurality of applications includes at least one suitable application. The method further includes comparing a first predetermined number of bits of the hash value to a corresponding first predetermined number of bits of the hash values for the plurality of applications, and determining that the first predetermined number of bits of the hash value matches at least some of the corresponding first predetermined number of bits of the hash values for at least some of the plurality of applications, the at least some of the plurality of applications comprising the at least one suitable application. The method also includes comparing each bit of the hash value for the content item with each bit of the hash values for the at least some of the plurality of applications, and determining a match between the comparison of each bit of the hash value for the content item with each bit of the hash values for the plurality of applications is limited to each bit of the hash value for the at least one suitable application. The method further includes requesting a copy of the at least one suitable application for execution on the device when the comparison of each bit of the hash value for the content item with each bit of the hash value for the at least one suitable application match, executing the at least one suitable application on the device, and providing a limited portion of information on the content item to the at least one suitable application for interaction by the user using a secure channel.

According to certain aspects of the present disclosure, a system for identifying and obtaining a suitable application for interacting with a selected content item by providing secure access to a limited portion of information on the selected content item is provided. The system includes means for receiving a selection from a user in an initial application running on a device to interact with a content item accessible by the initial application. The system also includes means for generating a hash value from a limited portion of information on the content item, comparing a portion of the hash value generated from the limited portion of information on the content item to a corresponding portion of a hash value generated for at least one suitable application available in an application database, comparing the hash value generated from the limited portion of information on the content item with the hash value generated for the at least one suitable application when the comparison of the portion of the hash value generated from the limited portion of information on the content item to the corresponding portion of the hash value generated for the at least one suitable application indicates a match, requesting a copy of the at least one suitable application for execution on the device when the comparison of the hash value generated from the limited portion of information on the content item with the hash value generated for the at least one suitable application match, executing the at least one suitable application on the device, and providing the limited portion of information on the content item to the at least one suitable application for interaction by the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
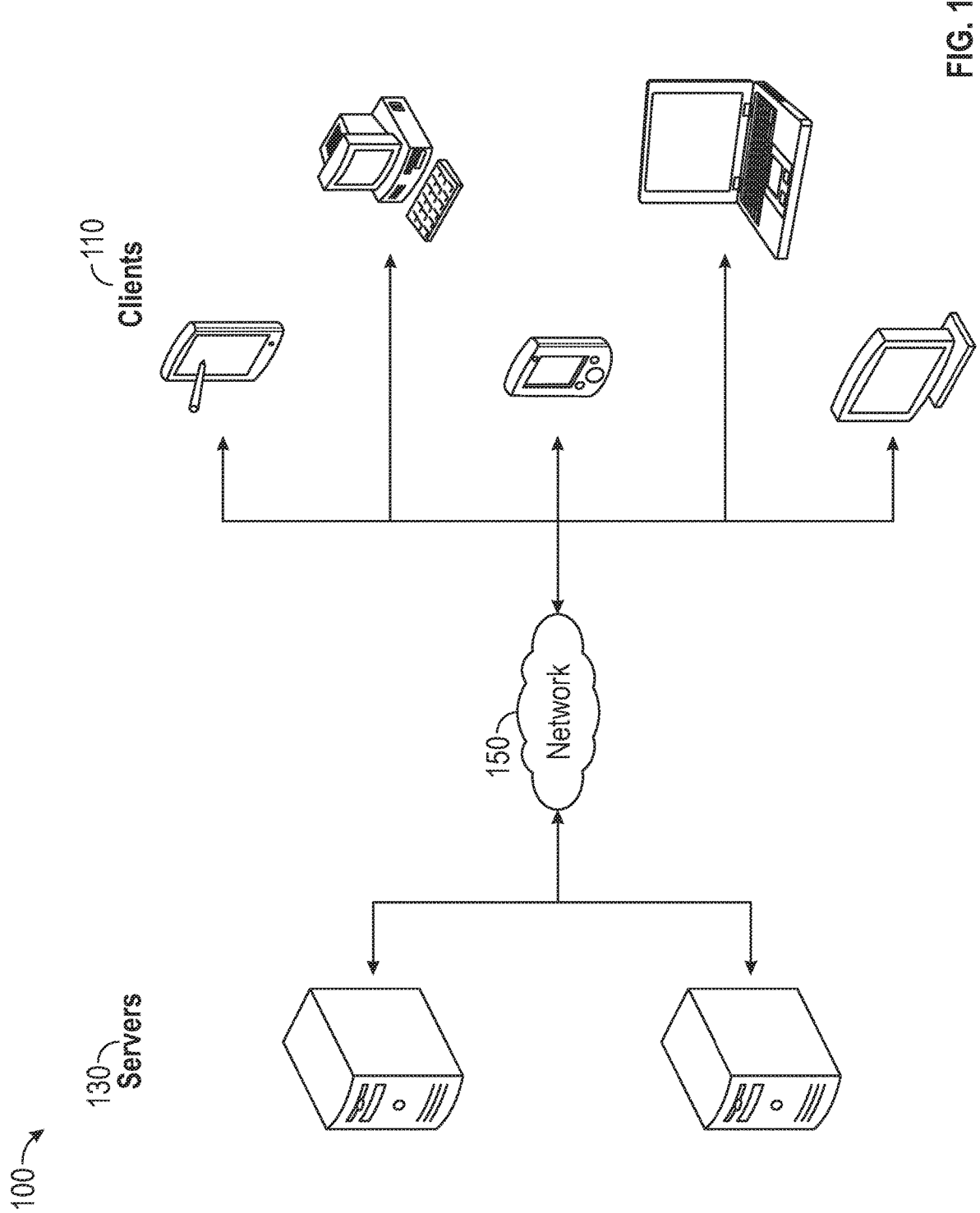
FIG. 1 illustrates an example architecture for identifying and obtaining a suitable application for interacting with a selected content item by providing secure access to a limited portion of information on the selected content item.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for identifying, by the system, a most relevant application in an application database (e.g., on a server) to view a content item by comparing a limited portion of information on the content item to information for the available applications in the application database to find an application most suitable for viewing the content item.

Specifically, after the user selects the item (or "abstract intent"), such as a Uniform Resource Locator (URL), in an initial application, such as a web browser, the initial application requests an activity manager running on the device to identify whether a more suitable application ("target", "app handler", or "component") is available on the user's device ("performing runtime binding") to view (or "resolve intent") the content item. If a more suitable application is not available on the user's device, the activity manager creates a hash value ("hashed prefix" or "cryptographically hashed abstract intent") from a limited portion of information on the content item (e.g., a hash of the host of the URL) and provides a portion (e.g., the first n bits) of the hash value to a resolver interface. The resolver interface compares the portion of the hash value for the content item to similar portions of hash values (e.g., the first n bits of a hash of the host of the URL) for available applications in the application database based on the items those available applications can view, and for available applications whose hash value portions (e.g., first n bits of the corresponding hash value) match the portion of the hash value for the content item, the complete hash value corresponding to items (e.g., all bits of the hash of the host of the URL) viewable for the available applications are provided to the activity manager by the resolver interface. The resolver interface then compares the complete hash value for the content item (e.g., all bits of the hash of the host of the URL) and identifies which available application, if any, has a corresponding complete hash value matching the complete hash value for the content item. When an available application is identified that has a matching complete hash value to the complete hash value for the content item, the resolver interface instructs an activity manager on the device to install the available application and provides the content item through a secure channel to the available application for viewing by the user in the available application after installation and execution of the available application. The resolver interface can further provide relevant information identifying parameters by which to launch the available application, such as, for example, where the content item may indicate a certain intent filter for which a certain module or component of the available application should be launched.

The disclosed system addresses a technical problem tied to computer technology and arising in the realm of computer networks, namely the technical problem of, in response to analysis of a selected data object on a device, identifying a preferred software application that is configured to access the data object, and obtain a copy of the preferred application, for example, over a network in order to access the selected data object. The disclosed system solves this technical problem by analyzing a database of possible software applications to identify a software application that is most suitable for accessing the selected data object, and obtaining a copy of the software application over a network if it is not available on the device. The disclosed system provides a solution necessarily rooted in computer technology as it relates to the analysis of a selected data object to identify, and obtain, a suitable software application for accessing the data object. For example, the disclosed system facilitates allowing content items such as URLs from the World Wide Web to become a more integral part of an operating system running on a device by permitting a single external provider check to determine whether to load a new application when the content item is selected. By providing access limited to a portion of a hash value of a content item in order to identify a suitable application, the disclosed solution reduces the amount of information that is accessible to, for example, the resolver interface, regarding a user's activity on a device within the initial application (e.g., URLs requested). As a result, risk to a user's privacy if the resolver interface is compromised is decreased because less information is available to the resolver interface, and it is more difficult to reconstruct the user's activity from the portion of the hash.

Although certain examples provided herein may describe a user's information (e.g., a selection of a data object to be accessed) being stored in memory, each user may grant explicit permission for such user information to be stored. The explicit permission may be granted using privacy controls integrated into the disclosed system. If requested user information includes demographic information, then the demographic information is aggregated on a group basis and not by individual user. Each user may be provided notice that such user information will be stored with such explicit consent, and each user may at any time end having the user information stored, and may delete the stored user information. The stored user information may be encrypted to protect user security.

The user can delete the user information from memory. Additionally, the user can adjust appropriate privacy settings to selectively limit the types of user information stored in memory, or select the memory in which the user information is stored (e.g., locally on the user's device as opposed to remotely a server). In many examples, the user information does not include and/or share the specific identification of the user the user's name) unless otherwise specifically provided or directed by the user. Certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Example System Architecture

FIG. 1 illustrates an example architecture 100 for identifying and obtaining a suitable application for interacting with a selected content item by providing secure access to a limited portion of information on the selected content item. The architecture 100 includes servers 130 and clients 110 connected over a network 150.

The clients 110 can be, for example, desktop computers, mobile computers, tablet computers (e.g., including e-book readers), mobile devices (e.g., a smartphone or personal digital assistant set top boxes (e.g., for a television), video game consoles, or any other devices having appropriate processor, memory, and communications capabilities for running an operating system and an initial application that provides access to a content item, such as a URL or document, for display. The initial application, upon selection of the content item, queries the operating system, and a process running on the operating system, such as an activity manager, determines whether another application (to be requested) more suitable than the initial application for interacting with the content item is available either on the client 110 or over the network 150 from one of the servers 130. If a more suitable application is available on the client 110, the activity manager causes the more suitable application to execute on the client 110 and load the content item. If, however, a suitable application is not available on the client 110 but available over the network 150 from a server 130, or a more suitable application is available over the network 150 than an existing application available on the client 110, then the activity manager causes the operating system of the client to obtain a copy of the more suitable application on the server 130 and executes the more suitable application with the loaded content item.

One of the many servers 130 is configured to host an application database that includes applications configured for interacting with various different types of content items. The database includes, for each application in the database, information on the type(s) of content items with which the corresponding application is configured to interact. The application database on the servers 130 can be queried by clients 110 over the network 150. For purposes of load balancing, multiple servers 130 can host the application database either individually or in portions.

The servers 130 can he any device having an appropriate processor, memory, and communications capability for hosting data encoder service. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
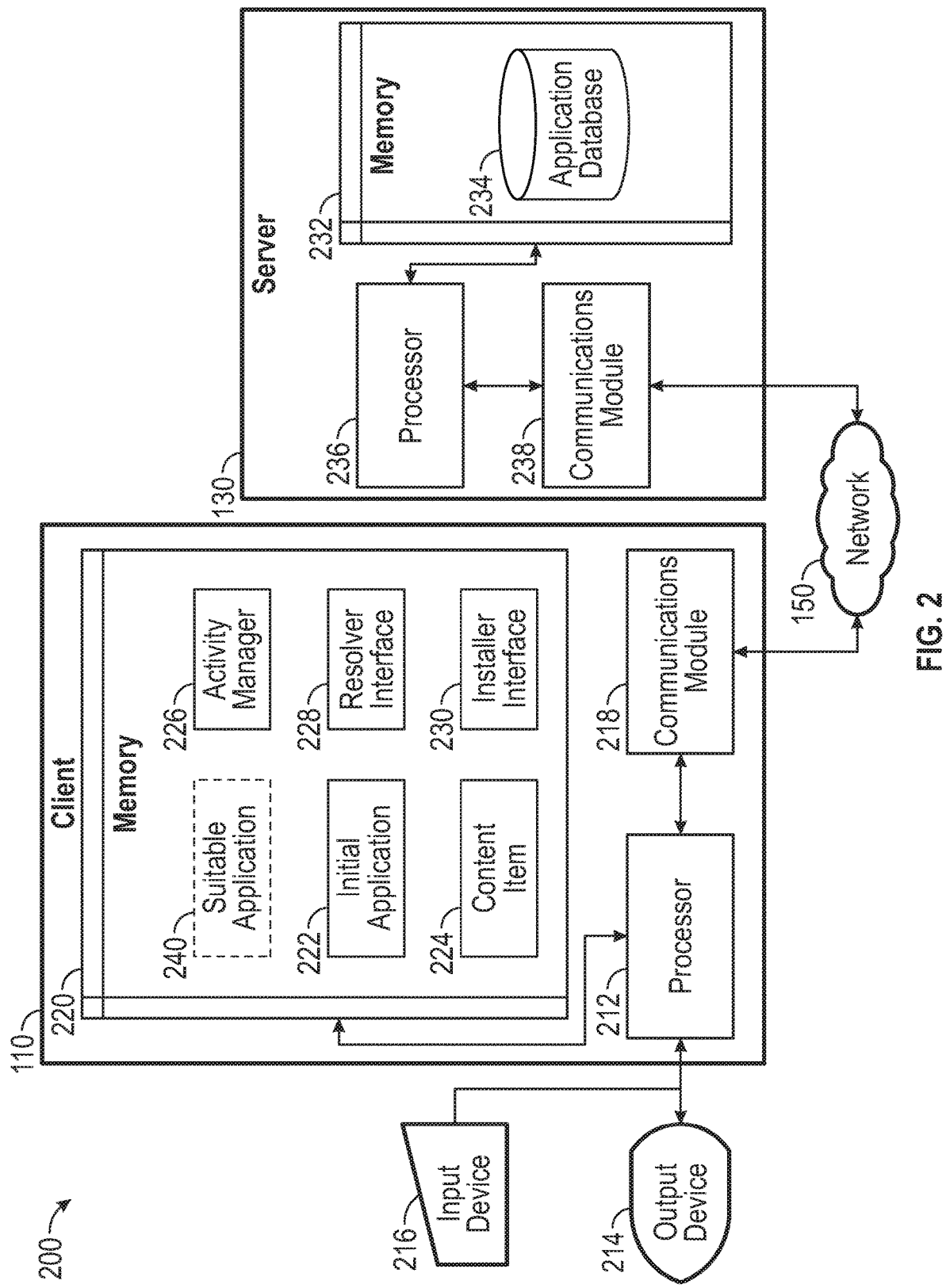
FIG. 2 is a block diagram illustrating an example client and server from the architecture of FIG. 1 according to certain aspects of the disclosure.

Example System for Identifying and Obtaining a Suitable Application for Interacting with a Selected Content Item FIG. 2 is a block diagram illustrating an example server 130 and client 110 in the architecture 100 of FIG. 1 according to certain aspects of the disclosure.

The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards. The client 110 also includes an input device 216, such as a touchscreen, keyboard, or mouse, and an output device 214, such as a display.

The client 110 further includes a processor 212, the communications module 218, and the memory 220. The memory 220 includes an initial application 222, a content item 224, an activity manager 226, a resolver interface 228, an installer interface 230, and a suitable application 240. The suitable application 240 is illustrated in phantom because it is optionally downloaded to the memory 220 of the client 110 from the application database 234 on the server 130 after being determined to be suitable for accessing the content item 224 in the memory 220 of the client 110.

The content item 224 can be, for example, a URL, a web page, a document such as a text document, a spreadsheet, a media file (e.g., audio, image, video, or any combination thereof), or any other data object configured to be interacted with by a user of the client 110. In certain aspects, the content items can be more generic intents such as actions to be performed including, for example, taking a photograph or listening to an audio file. The initial application 222 can be any application configured to provide access to the content item 224, such as a web browser, mobile application, document editor, or image viewer. In certain aspects, the initial application 222 is limited to providing access to the content item, such as identifying a location of the content item 224, but not permitting for the viewing or modification of the content item 224 by the user.

The activity manager 226 is a process (e.g., a software extension or facility) running in an operating system of the client 110 that is configured to receive and respond to requests from applications on the client 110 regarding access to data objects, such as the content item 224, in the memory 220 of the client 110. As described in further detail below, the activity manager 226 is in certain aspects configured to read configuration values to determine which applications or services are responsive to the resolver interface 228 and the installer interface 230. The activity manager 226 is also configured to determine whether to enable or disable the resolver interface 228 and the installer interface 230, and to present the ability to manage the resolver interface 228 and the installer interface 230 to the user of the client 110. The activity manager 226 is further configured to determine when and for which types of selected content items (e.g., abstract intents) the resolver interface 228 should be consulted, and then invoking the resolver interface 228 when appropriate. In certain aspects, certain types of content items can be excluded from evaluation by the resolver interface 228, such as certain domains or certain types of files.

The activity manager 226 is also configured, in certain aspects, for generating a limited portion of information (or "hint") on the content item 224 that is provided to the resolver interface 228, and for determining how that limited portion of information on the content item 224 is generated. For example, and as will be detailed further below, if the content item is a URL (e.g., "https://en.websiteencyclopedia.com/diabetes"), the information can be generated by dropping the scheme (e.g., "https") and path (e.g., "/diabetes"), and retaining only the host (e.g., "en.websiteencyclopedia.com"). The activity manager 226 can use a hashing algorithm, such as the SHA-256 hashing algorithm, on "en.websiteencyclopedia.com" and select the first 23 bits as the information that is provided to the resolver interface 228. Thus, assuming an order O(1B) URL hosts on the Internet, 23 bits would allow for about 100 other hosts to hash to this value of the information.

The activity manager 226 is yet further configured, in certain aspects, to receive from the resolver interface 228 a list of applications (or "candidate intent handlers") responsive to the provided information for the content item 224 and select the best matching application for the content item 224 if one exists. Assuming a best match exists, the activity manager 226 is then responsible for generating a success and failure case for whether the content item 224 is accessible by the matching application ("pending intents") and passing them along with an identification of the matching application to the installer interface 230 for installation.

The resolver interface 228, like the activity manager 226, is a process running in the operating system of the client 110. As described in further detail below, the resolver interface 228 is configured to receive from the activity manager information about the content item 224 the user has selected to interact with (e.g., the abstract intent to be resolved), and the resolver interface 228 returns to the resolver interface 228 a listing of potential applications to interact with the item (e.g., the set of candidate "app handlers"). The limited portion of information about the content item 224 can be a portion of a cryptographically hashed abstract intent. In certain aspects, the resolver interface 228 does not receive the full abstract intent (e.g., an entire URL) of the content item 224 that the activity manager 226 is trying to handle. The listing of potential applications to interact with the item can be provided in a data structure format that the operating system of the client 110 uses internally, such as intent filters. The resolver interface 228 is intended to respond with low latency (<200 ms) and for implementing caching strategies if server 130 infrastructure is used. The resolver interface 228 can be implemented as an application or service residing on the client 110.

The installer interface 230 is yet another process running in the operating system of the client 110. As described in further detail below, the installer interface 230 is configured to receive a request from the activity manager 226 to install a particular application (e.g., the suitable application 240), and in certain aspects include two data structures (e.g., a success intent and a failure intent) corresponding to the success case and the failure case. For example, if the installer interface 230 succeeds in performing the installation of the suitable application 240 requested by the installer interface 230, the installer interface 230 then launches the success intent (e.g., in launching the suitable application 240). If the installer interface 230 fails to perform the installation of the suitable application 240 requested by the activity manager 226, the installer interface 230 may then launch the failure intent, such as a different or default application for interacting with the content item 224. In certain aspects, the installer interface 230 does not receive the full abstract intent (e.g., complete information, such as a copy, of the content item 224) from the activity manager 226; the installer interface 230 receives un-inspectable data structures for determination of the success or failure intents.

In certain aspects, both the resolver interface 228 and the installer interface 230 are system components that can optionally be required to be system privileged applications. Additionally, in certain aspects, each of the activity manager 226, the resolver interface 228, and the installer interface 230 can be disabled by a user so that access of the content item 224 will occur according to default behavior available on the client 110 prior to configuration of the disclosed system. Furthermore, in certain aspects, the resolver interface 228 and the installer interface 230 can be a single interface, and additionally in certain aspects the activity manager 226, the resolver interface 228, and the installer interface 230 can be a single interface. In certain aspects, instead of using a cryptographic hashing function to generate a comparable value for the content item 224 and the applications from the application database 234, other hints regarding the content item 224 can be used such as, but not limited to, checksums, check digits, fingerprints, randomization functions, error-correcting codes, and ciphers.

The processor 212 of the client 110 is configured to execute instructions, such as instructions physically coded into the processor 212, instructions received from software in memory 220, or a combination of both. For example, the processor 212 of the client 110 executes instructions to identify and obtain a suitable application (e.g., the suitable application 240) for interacting with the content item 224 by providing secure access to a limited portion of information on the content item 224.

Specifically, the processor 212 of the client 110 executes instructions (e.g., from the initial application 222) causing the processor 212 to receive a selection from a user (using the input device 216) in the initial application 222 to interact with the content item 224 accessible by the initial application 222. For example, the user can click on, touch, or otherwise select a link to the content item 224 that is displayed (using the output device 214) in the initial application 222. The interaction can be of various kinds including, but not limited to, opening a URL, loading a web page, editing or viewing a document, or scanning a barcode.

The processor 212 of the client 110 also executes instructions (e.g., from the activity manager 226) causing the processor 212 to generate a hash value from a limited portion of information on the content item 224. The hash value can be generated using various cryptographic hash functions such as, for example, the Secure Hash Algorithm (SHA) 256 hash function ("SHA-256"), which is computed with 32-bit words. For example, in certain aspects where the content item 224 is a URL, the hash value is generated from a host from the URL.

The processor 212 of the client 110 further executes instructions (e.g., from the resolver interface 228) causing the processor 212 to compare a portion of the hash value generated from the limited portion of information on the content item 224 to a corresponding portion of a hash value generated for at least one suitable application 240 available in an application database 234. The client 110 is configured to access the application database 234 on the server 130 over the network 150 using the respective communications modules 218 and 238 of the client 110 and server 130.

In certain aspects, the hash value generated for the suitable application 240 available in an application database 234 is one of a plurality of hash values generated by the processor 212 for applications in the application database 234. Specifically, the processor 212 of the client 110 executes instructions (e.g., from the resolver interface 228) to generate, for each application in the application database 234 (including the suitable application 240), a corresponding hash value using information identifying content with which the corresponding application from the application database 234 is configured to interact.

Alternatively, the processor 236 of the server 130 is configured to generate the hash values for the applications in the application database 234, and the client 110 may request the generated hash values in order to perform the comparison with the portion of the hash value generated from the limited portion of information on the content item 224.

In these aspects, the processor 212 of the client 110 also executes instructions (e.g., from the resolver interface 228) to compare the portion of the hash value for the content item 224 to the corresponding portion of the hash values for the applications from the application database 234, and determine that the portion of the hash value for the content item 224 matches at least some of the corresponding portions of the hash values for at least some of the applications from the application database 234, including the portion of the hash value for the suitable application 240. For example, the first 23 bits of the hash value for the domain of the URL of the content item 224 is compared to the first 23 bits of each hash value for the domains of URL that are configured to be handled by each application in the application database 234, and those applications in the application database 234 that have matching 23 bit hash values to the 23 bits for the hash of the content item are identified to be applications that may be able to access the content item 224. The entire hash value for the content item 224 (e.g., all bits of the hash) is then compared (e.g., by the processor 212 of the client 110 and on the client 110) with the entire hash values for the subset of applications from the application database 234 that were previously determined to have matching portions of hash values, and a match between the comparison of the hash value for the content item 224 with the hash value for the suitable application 240 is identified. Specifically, the processor 212 of the client 110 further executes instructions (e.g., from the resolver interface 228) to compare the hash value (i.e., the complete hash value) for the content item 224 with the hash value (i.e., the complete hash value) for the suitable application 240 when the comparison of the portion of the hash value for the content item 224 to the corresponding portion of the hash value for the suitable application 240 indicates a match. For example, if the first 23 bits of the hash value for the content item 224 match the first 23 bits of the hash value for the suitable application 240, then all 32 bits of the hash value for the content item 224 are compared to all 32 bits of the hash value for the suitable application 240. In certain aspects, the comparison of the hash value (i.e., the complete hash value) for the content item 224 with the hash value (i.e., the complete hash value) for the suitable application 240 is performed on the client 110 in order to limit access to the compared information by the network 150 or server 130. If a portion of a hash value (e.g., the first 23 bits) for an application in the application database 234 does not match the portion of the hash value for the content item 224, then the application in the application database 234 is identified as an unsuitable candidate for accessing the content item 224.

In certain aspects, the processor 212 executes instructions from the activity manager 226) causing the processor 212 to, prior to comparing the portion of the hash value to the corresponding portion of the at least one hash value generated for the suitable application 240 available in the application database 234, determine that the client 110 does not include a local application (e.g., in memory 220) for interacting with the content item 224. The portion of the hash value generated for the suitable application 240 is generated by selecting a first predetermined number of bits (e.g., the first 23 bits of a SHA-256 hash) of the complete hash value generated for the suitable application 240.

The processor 212 of the client 110 yet further executes instructions (e.g., from the resolver interface 228) to request a copy of the suitable application 240 (e.g., by the installer interface 230 from the application database 234) for execution on the client 110 when the comparison of the hash value (i.e., the complete hash value) for the content item 224 with the hash value (i.e., the complete hash value) for the suitable application 240 match. In certain aspects, requesting the copy of the suitable application for execution on the client 110 includes downloading a copy of the suitable application 240 to the memory 220 of the client 110 (as illustrated in FIG. 2), while in certain aspects requesting the copy of the suitable application 240 for execution on the client 110 includes requesting an execution of the suitable application 240 be streamed to the client 110 (not illustrated).

As a result, the installer interface 230 and application database 234 receive limited information regarding the content item 224 in order to identify and provide a copy of the suitable application 240 for execution on the client 110 for interaction with the content item 224. For example, for a URL for an encyclopedia article on diabetes to be viewed by an encyclopedia application, the installer interface 230 will know it is installing an encyclopedia application to view an encyclopedia article, but the installer interface 230 will not know the article will be for diabetes.

The processor 212 of the client 110 yet further executes instructions from the activity manager 226) to execute the suitable application 240 on the client 110 (e.g., by running the suitable application 240 locally or having it streamed from a server), and provides a limited portion of information on the content item 224 to the suitable application 240 for interaction by the user. Although by this provision the suitable application 240 has complete access to the information on the content item 224, the access can be secured by having a limited portion of information on the content item 224 be provided to the suitable application 240 using a secure channel. For example, when the content item 224 is a URL, the activity manager 226 does not divulge the full URL to the resolver interface 228 or the installer interface 230, but instead provides the full URL to the suitable application 240 via the secure channel after the suitable application 240 is running on the client 110.

In certain aspects, when the comparison of the portion of the hash value for the content item 224 to the corresponding portion of the hash value for the suitable application 240 do not indicate a match, or when the comparison of the hash value (i.e., the complete hash value) for the content item 224 with the hash value (i.e., the complete hash value) for the suitable application 240 do not indicate a match, then the processor 212 of the client 110 is configured to execute instructions (e.g., from the activity manager 226) to, as the failure case, obtain and execute (e.g., using installer interface 230) a default application from the application database 234 or execute a default application in the memory 220 of the client 110 to access the content item 224. The default application can be, for example, the initial application 222 in which the content item 224 is initially provided for selection by the user of the client 110.

Thus, in certain aspects, when the content item 224 is selected by the user in the initial application 222, the activity manager 226 instructs the processor 212 of the client to first load a preferred application for accessing the content item 224 on the client 110 if such preferred application exists in memory. If such preferred application does not exist in memory, the activity manager obtains a suitable verified application from the application database 234 to access the content item 224 on the client 110 as described above, and if a suitable verified application is not available, then a suitable unverified application can be obtained instead. If neither a suitable verified or unverified application can be obtained or identified, then a default application can be used to access the content item 224, as described above. As discussed herein, a "verified" application includes an application that has been scanned for detection of harmful software code, such as malware.

In certain aspects, in order to reduce any latency between selection of the content item 224 and an identification of the suitable application 240 from the application database 234 as suitable for accessing the content item 224, including a network trip required to determine that another application (i.e., the suitable application 240) suitable for interacting with the content item 224 is available in the application database 234, caching strategies are implemented in certain aspects of the disclosed system to minimize network round-trips to take less than, for example, 200 ms, which can be a time limit configured in an operating system of the client 110. In these aspects, various data can be cached in the memory 220 of the client after being generated or received, including, for example, an identification of applications in the application database 234 and the types of items those applications can interact with, hash values associated with each of the applications in the application database 234. This information can be cached on a scheduled, periodic basis, or after every certain number of times the information is requested from the application database 234 in response to selection of a content item on the client 110.

As discussed above, the disclosed system provides two interfaces, the resolver interface 228 and the installer interface 230 into the client operating system's intent resolution facility, the activity manager 226. The two interfaces 228 and 230 are queried during intent resolution for the content item 224 by the activity manager 226 for candidate app handlers that are not yet known to the activity manager 226. The resolver interface 228 provides a candidate set of app handlers without knowing the true original abstract intent of the content item 224. The installer interface 230 performs installation for the suitable application 240 that is requested by the activity manager 226 and passes along the success or failure intents also without knowing the original abstract intent for the content item 224. In this way, the operating system through the activity manager 226 enables late, run-time binding between code in different applications without revealing the abstract intent to an external source and without requiring that the candidate matches be present within purview of the operating system, and without being present on the client 110.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
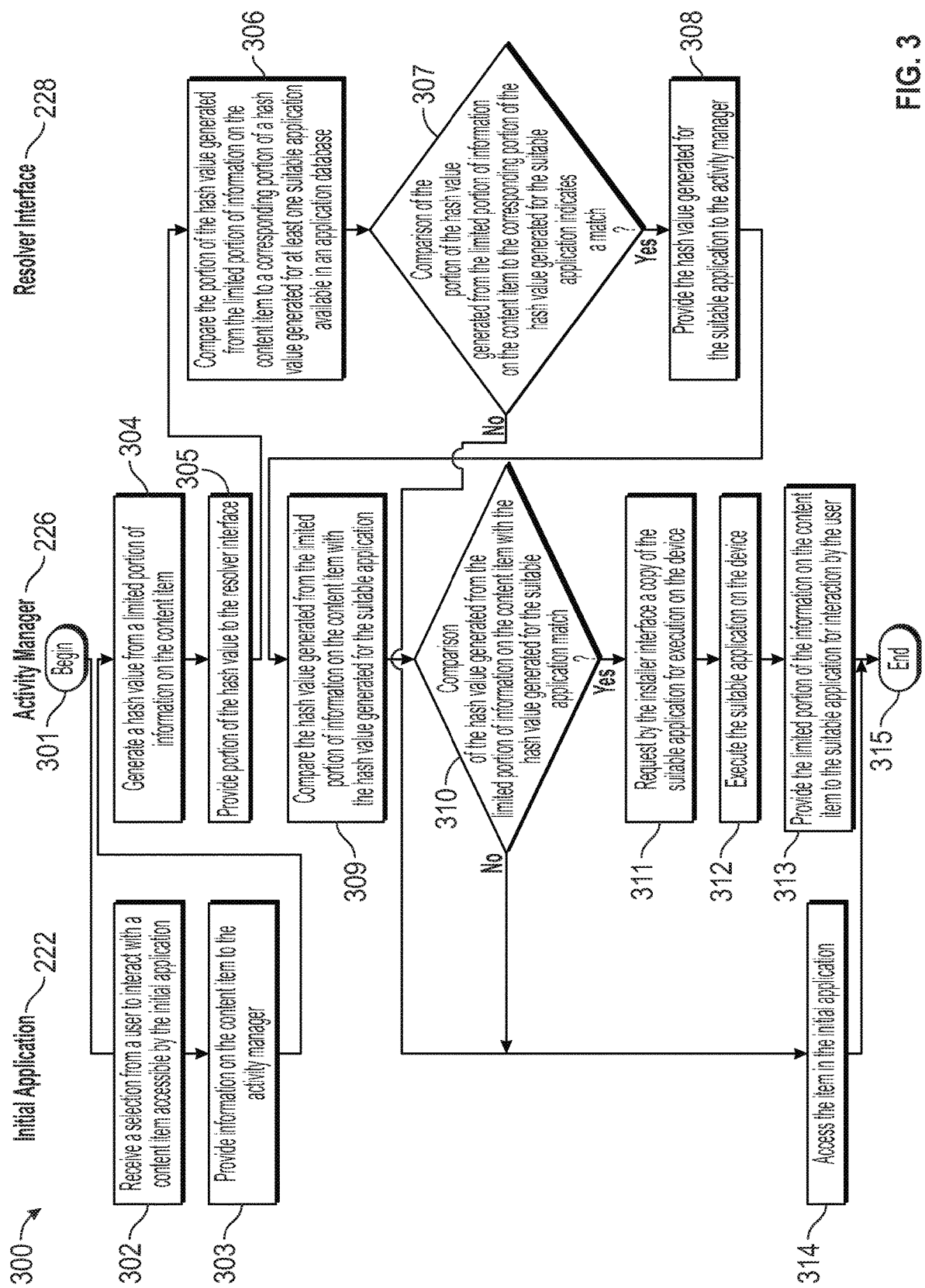
FIG. 3 illustrates an example process for identifying and obtaining a suitable application for interacting with a selected content item by providing secure access to a limited portion of information on the selected content item using the example client of FIG. 2.

FIG. 3 illustrates an example process 300 for identifying and obtaining a suitable application for interacting with a selected content item by providing secure access to a limited portion of information on the selected content item using the example client 110 of FIG. 2. While FIG. 3 is described with reference to FIG. 2, it should be noted that the process steps of FIG. 3 may be performed by other systems.

The process 300 begins by proceeding from beginning step 301 when a user loads an initial application 222 on the client 110 and views a content item 224 in the initial application 222, and proceeds to step 302 when the initial application 222 receives a selection from the user to interact with the content item 224 accessible by the initial application. Next, in step 303, the initial application 222 provides a limited portion of information on the content item 224 to the activity manager 226, and the activity manager 226 in step 304 generates a hash value from the limited portion of information on the content item 224. In step 305 the activity manager 226 provides a portion of the hash value of the content item 224 to the resolver interface 228.

Turning to the resolver interface 228, in step 306, the resolver interface 228 compares the portion of the hash value of the content item 224 to a corresponding portion of at least one hash value generated for an application (i.e., the suitable application 240) available in the application database 234, and in step 307 if the comparison of step 306 indicates the portion of the hash value of the content item 224 matches a corresponding portion of at least one hash value generated for an application (i.e., the suitable application 240) available in the application database 234, the process 300 proceeds to step 308. Otherwise, the process 300 proceeds to step 314 where the initial application 222 as a failure intent provides access to the content item 224 in the initial application 222, after which the process 300 ends in step 315. In certain aspects not illustrated, in step 314 the content item 224 can be accessed in a different application on the client 110 that is configured for accessing the content item 224.

Returning to step 308 at the resolver interface 228, when the portion of the hash value of the content item 224 matches a corresponding portion of at least one hash value generated for an application (i.e., the suitable application 240) available in the application database 234, the resolver interface 228 provides the hash value (i.e., the entire hash value) generated for the suitable application 240 to the activity manager 226. In step 309, the activity manager 226 compares the hash value (i.e., the entire hash value) for the content item 224 with the hash value (i.e., the entire hash value) for the suitable application 240. If, however, the portion of the hash value for the content item 224 does not match the corresponding portion of a hash value generated for an application in the application database 234, then the application in the application database 234 is identified as an unsuitable candidate for accessing the content item 224. In step 310, if the comparison of the hash value for the content item 224 with the hash value for the suitable application 240 match, then the process 300 proceeds to step 311, otherwise the process 300 proceeds to step 314 discussed above.

In step 311, when the hash value for the content item 224 with the hash value for the suitable application 240 match, the activity manager 226 requests a copy of the suitable application 240 for execution on the client 110, and in step 312 the suitable application 240 executes on the client 110. In step 313, the activity manager 226 provides a limited portion of information on the content item 224 to the suitable application 240 for interaction by the user, and the process 300 then ends in step 315.

FIG. 3 sets forth an example process 300 for identifying and obtaining a suitable application for interacting with a selected content item by providing secure access to a limited portion of information on the selected content item using the example client 110 of FIG. 2. An example will now be described using the example process 300 of FIG. 3, a client 110 that is a smartphone, an initial application 222 that is a web browser, a content item 224 that is a link to a web page for the city Anytown on a travel website TripTrip, and a suitable application 240 that is a TripTrip application available from the travel website TripTrip for installation and execution on the smartphone client 110.

Figures 4A, 4B:
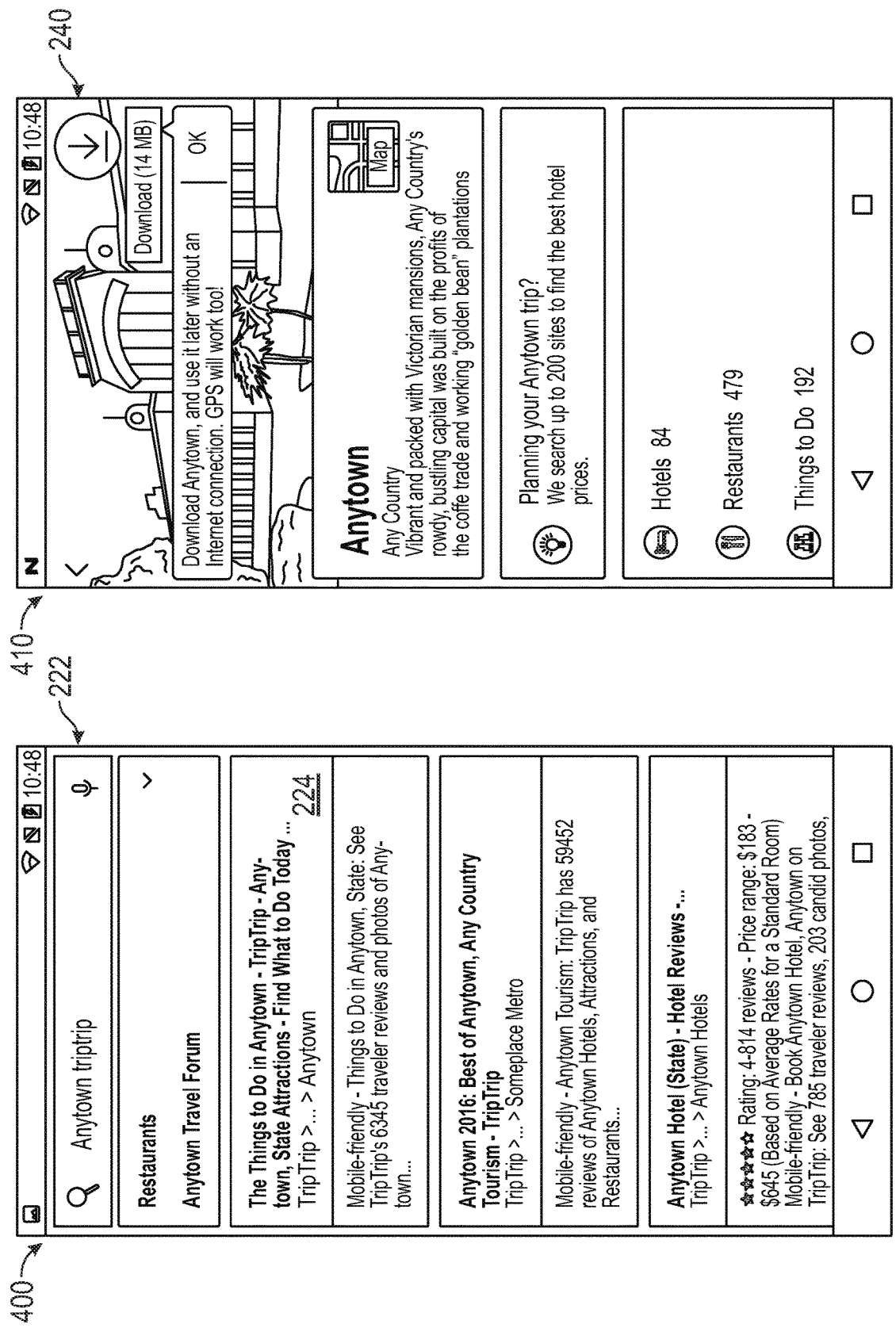
FIGS. 4A-4C are example illustrations associated with the example process of FIG. 3.

The process 300 begins by proceeding from beginning step 301 when a user loads a web browser application 222 on the smartphone client 110 and receives search results that include a URL for a link item 224 to a web page for the city Anytown on a travel website as provided in the example illustration 400 of FIG. 4B, and proceeds to step 302 when the user selects the link item 224 in the web browser application 222. Next, in step 303, the web browser application 222 provides information on the link item 224 to the activity manager 226, and the activity manager 226 in step 304 generates a SHA-256 hash value from the domain "www.triptrip.com" of the URL of the link item 224. In step 305 the activity manager 226 provides the first 23 bits of the SHA-256 hash value for the domain of the link item 224 to the resolver interface 228.

Turning to the resolver interface 228, in step 306, the resolver interface 228 compares the first 23 bits of the SHA-256 hash value for the domain of the link item 224 to the corresponding first 23 bits of a SHA-256 hash value for the web domain of each application (including the TripTrip application 240) available in the application database 234 lists the corresponding application is suitable for accessing. In step 307 the comparison of step 306 indicates the portion of the SHA-256 hash value for the domain of the link item 224 matches the corresponding portion of the SHA-256 hash value generated for the TripTrip application 240 available in the application database 234, and the process 300 proceeds to step 308 at the resolver interface 228.

In step 308, the resolver interface 228 provides the entire hash value generated for the TripTrip application 240 (i.e., all of the bits) to the activity manager 226. In step 309, the activity manager 226 compares all of the bits of the hash value (e.g., for the domain) of the link item 224 with all of the bits of the hash value for the domain that can be handled by the TripTrip application 240. In step 310, the comparison of all of the bits of the SHA-256 hash value for the domain of the link item 224 with all of the bits of the SHA-256 hash value for the domain handled by the TripTrip application 240 match, and the process 300 proceeds to step 311.

Figure 4C:
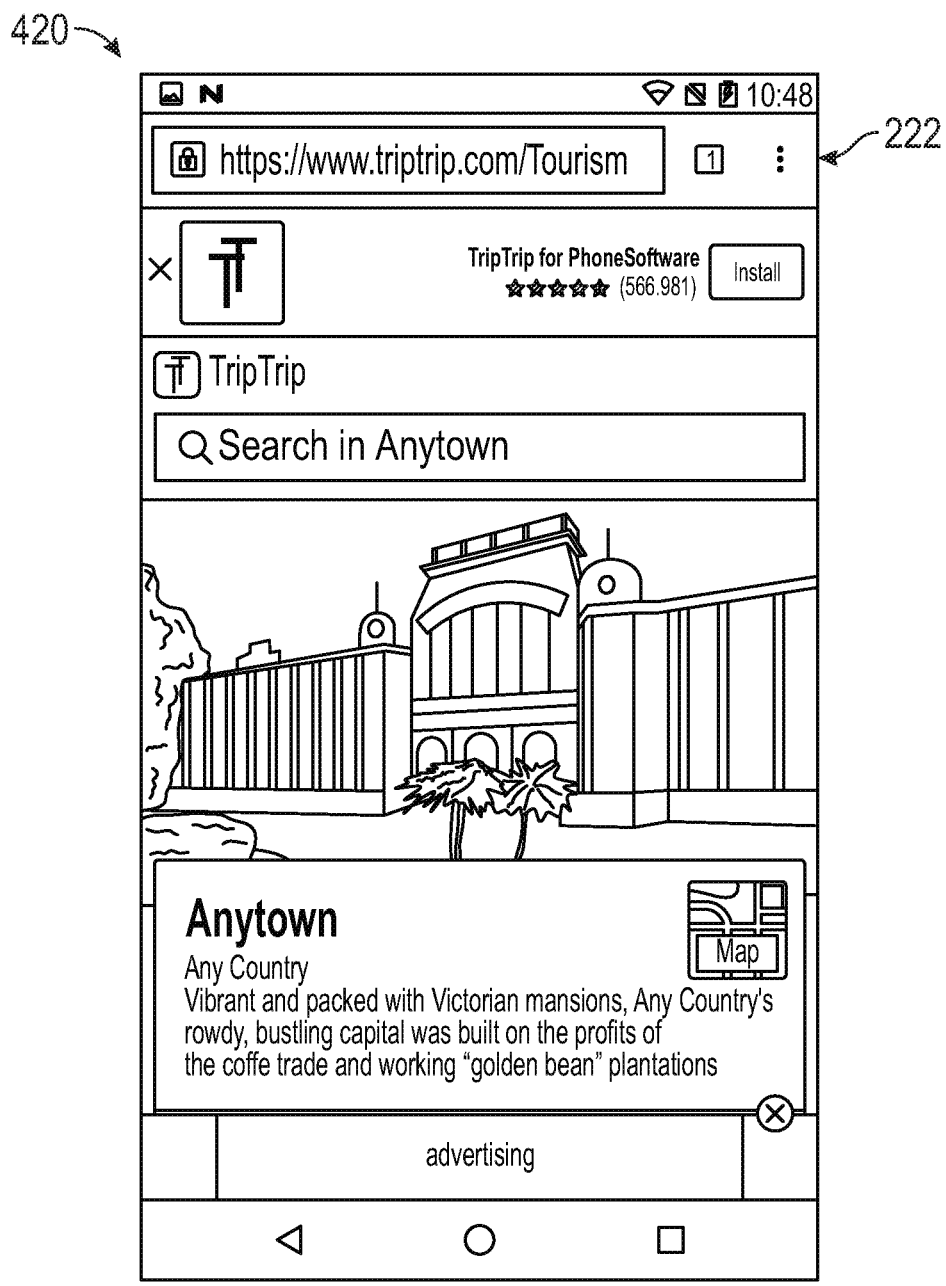

In step 311, the activity manager 226 requests a copy of the TripTrip application 240 for execution on the client 110, which the installer interface 230 requests from the application database 234 and installs, and in step 312 the TripTrip application 240 executes on the smartphone client 110. In step 313, the activity manager 22.6 provides the complete URL for the link item 224 to the TripTrip application 240 for interaction by the user and the appropriate content is loaded in the TripTrip application 240 as provided in the example illustration 410 of FIG. 4B. If, however, the process 300 had proceeded to step 314 from either step 307 or step 310, then the link item 224 would be provided for display in the web browser application 222 as provided in the example illustration 420 of FIG. 4C. The process 300 ends in step 315.

Hardware Overview

Figure 5:
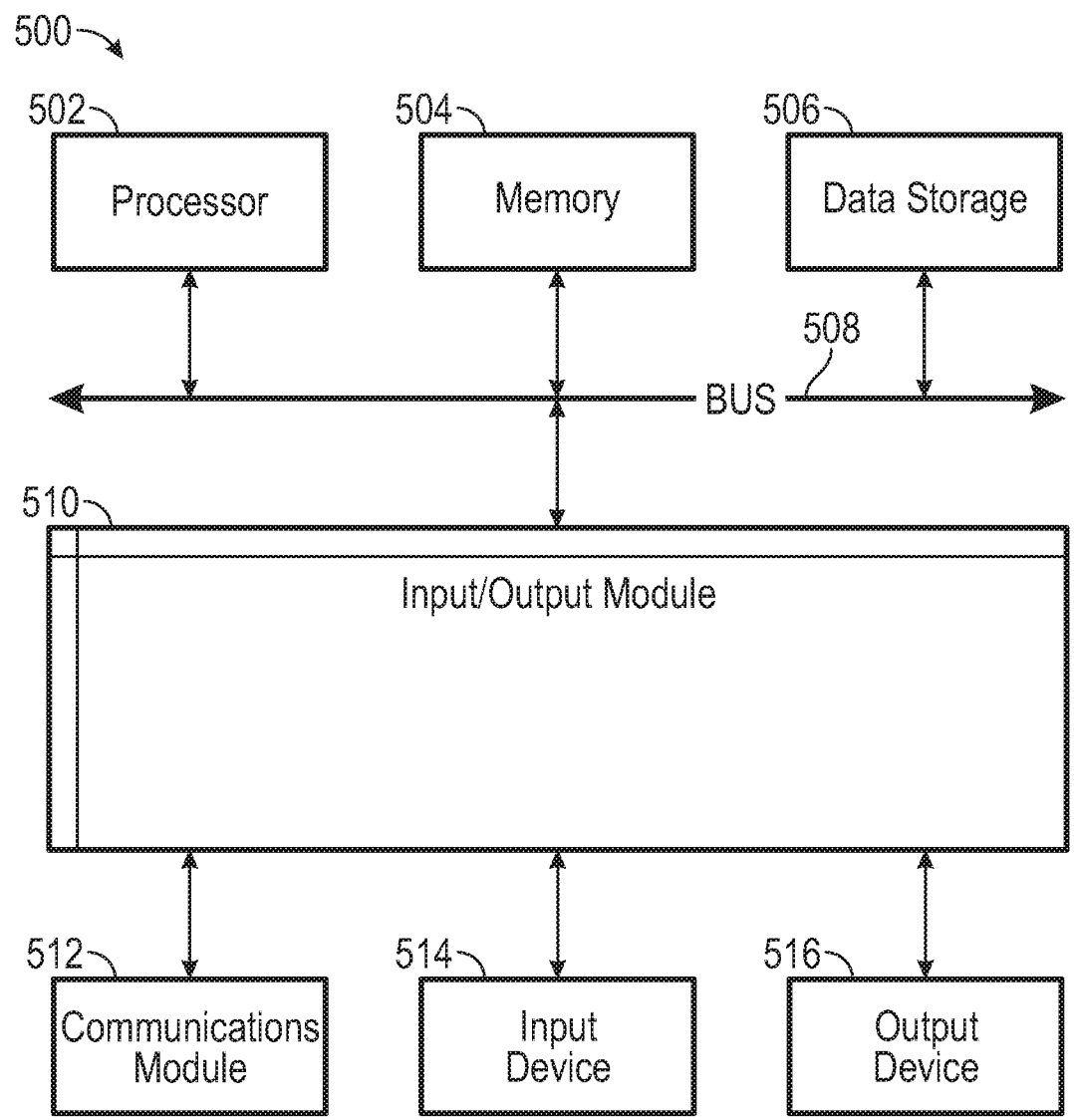
FIG. 5 is a block diagram illustrating an example computer system with which the clients and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may he provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., communications modules 218 and 238) include networking interface cards, such as Ethernet cards and modems.

The components of the system can be interconnected by any form or medium of digital data communication, e.g., a communication network. The communication network (e.g., network 150) can include, for example, any one or more of a PAN, a LAN, a CAN, a MAN, a WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (CPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the Internet. The local network and Internet both use electrical, electromagnetic or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link and communications module 512. In the Internet example, a server might transmit a requested code for an application program through Internet, the ISP, the local network and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for identifying and obtaining a suitable application for interacting with a selected content item by providing secure access to a limited portion of information on the selected content item, the method comprising:
    receiving a selection from a user in an initial application running on a device to interact with a content item accessible by the initial application;
    generating a hash value from a limited portion of information on the content item;
    providing, by an activity manager to a resolver interface, a portion of the hash value generated from the limited portion of information on the content item for comparison to a corresponding portion of a hash value generated for at least one application, wherein each respective hash value generated for the at least one application is available in an application database;
    when the comparison of the portion of the hash value generated from the limited portion of information on the content item to the corresponding portion of the hash value generated for the at least one application indicates a match, then:
        receiving, by the activity manager from the resolver interface, a full hash value generated for the at least one application from the application database; and
        comparing, by the activity manager, the hash value generated from the limited portion of information on the content item with the full hash value generated for the at least one application;
    when the comparison of the hash value generated from the limited portion of information on the content item with the full hash value generated for the at least one application indicates a match for at least one suitable application, then requesting a copy of the at least one suitable application for execution on the device;
    executing the at least one suitable application on the device; and
    providing the limited portion of information on the content item to the at least one suitable application for interaction by the user.

2. The method of claim 1,
    wherein the content item is a Uniform Resource Locator (URL), and
    wherein the hash value generated from the limited portion of information on the content item is generated from a host from the URL.

3. The method of claim 1, further comprising:
    prior to providing the portion of the hash value generated from the limited portion of information on the content item for comparison to the corresponding portion of the hash value generated for the at least one application, determining that the device does not include a local application suitable for interacting with the content item.

4. The method of claim 1, wherein the portion of the hash value is generated by selecting a first predetermined number of bits of the hash value.

5. The method of claim 1, wherein the comparison of the portion of the hash value generated from the limited portion of information on the content item to the corresponding portion of the hash value generated for the at least one application is performed on the device.

6. The method of claim 1, wherein requesting the copy of the at least one suitable application for execution on the device comprises downloading a copy of the at least one suitable application.

7. The method of claim 1, wherein requesting the copy of the at least one suitable application for execution on the device comprises requesting an execution of the at least one suitable application be streamed to the device.

8. The method of claim 1, wherein the limited portion of information on the content item is provided to the at least one suitable application for interaction by the user using a secure channel.

9. The method of claim 1, further comprising:
    generating, for each of a plurality of applications in the application database, a corresponding hash value using information identifying content with which a corresponding application from the plurality of applications is configured to interact, wherein the plurality of applications comprises the at least one suitable application;
    comparing the portion of the hash value generated from the limited portion of information on the content item to the corresponding portion of the hash values for the plurality of applications;
    determining that the portion of the hash value generated from the limited portion of information on the content item matches at least some of the corresponding portions of the hash values for at least some of the plurality of applications, the at least some of the plurality of applications comprising the at least one suitable application;
    comparing the hash value generated from the limited portion of information on the content item with the hash values for the at least some of the plurality of applications; and
    determining a match between the comparison of the hash value generated from the limited portion of information on the content item with the hash values for the plurality of applications is limited to the hash value for the at least one suitable application.

10. A system for identifying and obtaining a suitable application for interacting with a selected content item by providing secure access to a limited portion of information on the selected content item, the system comprising:

a memory comprising:
   a content item; and
   an initial application; and
a processor configured to execute instructions which, when executed, cause the processor to:
   receive a selection from a user in the initial application running on a device to interact with the content item accessible by the initial application;
   generate a hash value from a limited portion of information on the content item;
   determine the device does not include a local application suitable for interacting with the content item;
   provide, by an activity manager to a resolver interface, a portion of the hash value generated from the limited portion of information on the content item for comparison to a corresponding portion of a hash value generated for at least one application, wherein each respective hash value generated for the at least one application is available in an application database;
   when the comparison of the portion of the hash value generated from the limited portion of information on the content item to the corresponding portion of the hash value generated for the at least one application indicates a match, then:
      receive, by the activity manager from the resolver interface, a full hash value generated for the at least one application from the application database; and
      compare, by the activity manager, the hash value generated from the limited portion of information on the content item with the full hash value generated for the at least one application;
   when the comparison of the hash value generated from the limited portion of information on the content item with the full hash value generated for the at least one application indicates a match for at least one suitable application, then request a copy of the at least one suitable application for execution on the device;
   execute the at least one suitable application on the device; and
   provide a limited portion of information on the content item to the at least one suitable application for interaction by the user.

11. The system of claim 10, wherein the content item is a Uniform Resource Locator (URL), and wherein the hash value generated from the limited portion of information on the content item is generated from a host from the URL.

12. The system of claim 10, wherein the portion of the hash value is generated by selecting a first predetermined number of bits of the hash value.

13. The system of claim 10, wherein the comparison of the portion of the hash value generated from the limited portion of information on the content item to the corresponding portion of the hash value generated for the at least one application is performed on the device.

14. The system of claim 10, wherein requesting the copy of the at least one suitable application for execution on the device comprises downloading a copy of the at least one suitable application.

15. The system of claim 10, wherein requesting the copy of the at least one suitable application for execution on the device comprises requesting an execution of the at least one suitable application be streamed to the device.

16. The system of claim 10, wherein the limited portion of information on the content item is provided to the at least one suitable application for interaction by the user using a secure channel.

17. The system of claim 10, wherein the processor is further configured to execute instructions which, when executed, cause the processor to:
   generate, for each of a plurality of applications in the application database, a corresponding hash value using information identifying content with which the corresponding application from the plurality of applications is configured to interact, wherein the plurality of applications comprises the at least one suitable application;
   compare the portion of the hash value generated from the limited portion of information on the content item to the corresponding portion of the hash values for the plurality of applications;
   determine that the portion of the hash value generated from the limited portion of information on the content item matches at least some of the corresponding portions of the hash values for at least some of the plurality of applications, the at least some of the plurality of applications comprising the at least one suitable application;
   compare the hash value generated from the limited portion of information on the content item with the hash values for the at least some of the plurality of applications; and
   determine a match between the comparison of the hash value generated from the limited portion of information on the content item for the content item with the hash values for the plurality of applications is limited to the hash value for the at least one suitable application.

18. A non-transitory machine-readable storage medium comprising machine-readable instructions for causing a processor to execute functions for identifying and obtaining a suitable application for interacting with a selected content item by providing secure access to a limited portion of information on the selected content item, the functions comprising:
   receiving a selection from a user in an initial application running on a device to interact with a content item comprising a Uniform Resource Locator (URL) accessible by the initial application;
   generating a hash value from a host of the URL;
   determining the device does not include a local application suitable for interacting with the content item;
   generating, for each of a plurality of applications in an application database, a corresponding hash value using information identifying a host with which the corresponding application from the plurality of applications is configured to interact, wherein the plurality of applications comprises at least one suitable application;
   providing, by an activity manager to a resolver interface, a first predetermined number of bits of the hash value for comparison to a corresponding first predetermined number of bits of the hash values for the plurality of applications;
   determining that the first predetermined number of bits of the hash value matches at least some of the corresponding first predetermined number of bits of the hash values for at least some of the plurality of applications, the at least some of the plurality of applications comprising the at least one suitable application;
   receiving, by the activity manager from the resolver interface, full hash values generated for the at least some of the plurality of applications;

comparing each bit of the hash value for the content item with each bit of the full hash values generated for the at least some of the plurality of applications; and determining a match between the comparison of each bit of the hash value for the content item with each bit of the full hash values for the plurality of applications is limited to each bit of the full hash value for the at least one suitable application;

when the comparison of each bit of the hash value for the content item with each bit of the full hash value for the at least one suitable application match, then requesting a copy of the at least one suitable application for execution on the device;

executing the at least one suitable application on the device; and providing a limited portion of information on the content item to the at least one suitable application for interaction by the user using a secure channel.

19. The non-transitory machine-readable storage medium of claim 18, wherein requesting the copy of the at least one suitable application for execution on the device comprises downloading a copy of the at least one suitable application, or requesting an execution of the at least one suitable application be streamed to the device.

20. The non-transitory machine-readable storage medium of claim 18, the functions further comprising:

receiving a request from a user to disable the requesting the copy of the at least one suitable application for execution on the device; and in response to receiving the selection from the user in the initial application running on the device to interact with the content item, providing the content item in a default application available on the device for interaction by the user.

* * * * *